United States Patent
Frank

(10) Patent No.: US 6,208,602 B1
(45) Date of Patent: Mar. 27, 2001

(54) PREFORMATTING AN OPTICAL DISK WITH POSITIONING INFORMATION IN BOUNDARY AREAS BETWEEN NON-WRITTEN INFORMATION BLOCK AREAS

(75) Inventor: Franz H. U. Frank, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/971,186

(22) Filed: Nov. 17, 1997

(30) Foreign Application Priority Data

Nov. 18, 1996 (EP) .................................................. 96203218

(51) Int. Cl.[7] ...................................................... G11B 3/90
(52) U.S. Cl. .......................................... 369/58; 369/275.2
(58) Field of Search .................................. 369/14, 13, 32, 369/47, 48, 54, 58, 44.26, 275.2, 275.3

(56) References Cited

U.S. PATENT DOCUMENTS

| 4,901,300 | * | 2/1990 | Zande et al. | 369/47 |
| 5,187,699 |   | 2/1993 | Raaymakers et al. | 369/48 |
| 5,430,698 | * | 7/1995 | Nonaka et al. | 369/32 |
| 5,471,441 | * | 11/1995 | Nonaka et al. | 369/32 |
| 5,508,988 | * | 4/1996 | Nonaka et al. | 369/58 |
| 5,544,165 | * | 8/1996 | Yokota et al. | 369/32 |
| 5,559,765 | * | 9/1996 | Andou | 369/32 |

FOREIGN PATENT DOCUMENTS

| 0552986A2 | 7/1993 | (EP) . |
| 0557717A2 | 9/1993 | (EP) . |

\* cited by examiner

Primary Examiner—Tan Dinh
(74) Attorney, Agent, or Firm—Michael E. Belk

(57) ABSTRACT

Reading partly written record carriers using a reading device which positions the read head on the basis of written marks presents problems when an information block behind a non-written area must be read. A writing device and a method of writing information blocks on a record carrier of a rewritable type such as a CD-RW or a DVD-RAM include the following. First, record carrier areas which are in use for writing information blocks, are detected, for example, using the corresponding writing instructions. Subsequently, it is detected whether boundary areas adjoining the areas which are in use are unwritten. In that case, the boundary areas are initialized by writing them with dummy information, preferably with dummy information blocks comprising address information in the conventional manner. A record carrier is provided with status information which is indicative of the non-written state of areas. A reading device is provided with search means for searching written areas. Apparatus is provided for programming a computer system to provide programmed apparatus to implement the method.

23 Claims, 6 Drawing Sheets

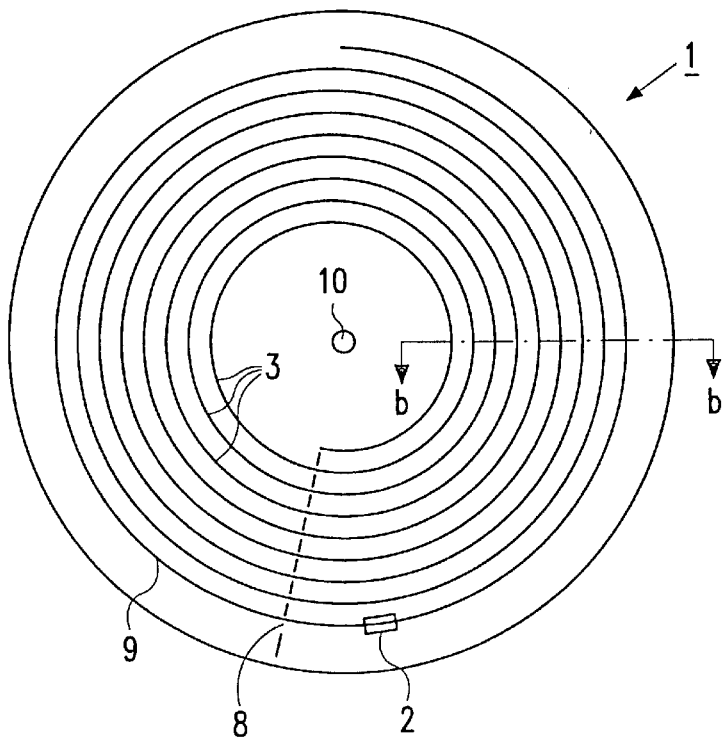
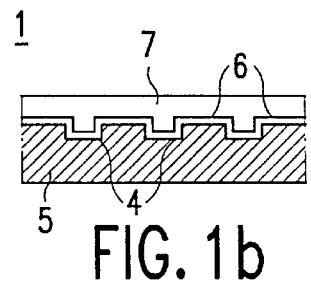
FIG. 1a
FIG. 1b
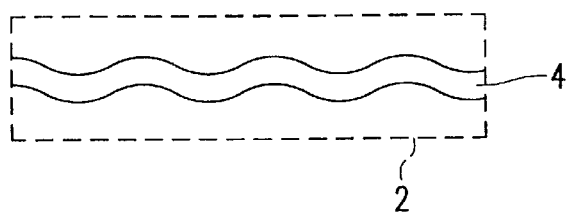
FIG. 1c
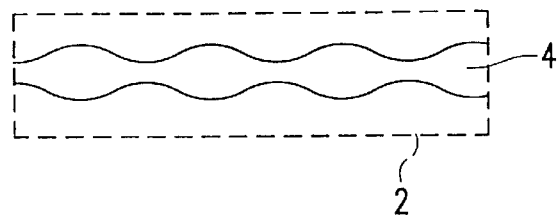
FIG. 1d

PREFORMATTING AN OPTICAL DISK WITH POSITIONING INFORMATION IN BOUNDARY AREAS BETWEEN NON-WRITTEN INFORMATION BLOCK AREAS

BACKGROUND OF THE INVENTION

The invention relates to a device for writing information blocks in a track pattern on a record carrier of a rewritable type, which device is provided with a writing unit for writing areas of the record carrier via (i.e. by using) a beam of electromagnetic radiation with marks representing the information blocks, and positioning means for positioning the writing unit based on a track structure which defines a track pattern on the record carrier.

The invention also relates to a method of writing information blocks in a track pattern on a record carrier of the rewritable type. Marks representing the information blocks are written in areas of the record carrier via a writing unit via a beam of electromagnetic radiation. The writing unit is positioned on the basis of a track structure which defines the track pattern.

The invention further relates to a record carrier for use in the writing device.

Moreover, the invention relates to a reading device for reading information blocks represented by optically readable marks in a track pattern on a record carrier. The device is provided with a reading unit for reading the marks via a beam of electromagnetic radiation, and apparatus for positioning the reading unit on the basis of the marks.

A writing device, a method and a record carrier of the type described in the opening paragraph for writing information blocks are known from U.S. Pat. No. 4,901,300 (PHN 12.398). In the system described in that document, information blocks are recorded in a track pattern on the record carrier and represented by optically readable marks. The record carrier has a track structure in the form of a wobbling pregroove having a varying frequency which represents position information. The writing device has a write head for scanning the record carrier via a beam of electromagnetic radiation. The tracking signals are derived from reflected radiation. The writing device includes for positioning the write head during scanning based on the position information. During scanning, the wobble causes a modulation in the tracking signals. This modulation comprises the position information coded therein, which indicates the absolute position in the track with respect to the starting point of the area intended for information. The information blocks are recorded on the record carrier at a desired position in conformity with their address, while the write head is positioned, if necessary via a jump to another radial position in the track, on the basis of the position information. A record carrier may have been partly written and then includes written areas in which marks are present, and non-written areas in which only the track structure is present. There are reading devices which derive the tracking signals and/or position information from the marks.

SUMMARY OF THE INVENTION

The inventors recognize the position information can not be generated in non-written areas, so that a partly written record carrier is not reliably readable.

It is, inter alia, an object of the invention to provide apparatus with which a partly written record carrier can be read more reliably.

In accordance with a first aspect of the invention, a writing device is therefore characterized in that the device is provided with first detection means for detecting areas of the record carrier which are in use for writing information blocks, and second detection apparatus for detecting non-written boundary areas adjoining the areas which are in use, and initialization apparatus for writing the non-written boundary areas with dummy information. The writing device according to the invention has, inter alia, the advantage that partly written record carriers can be read reliably by reading devices which derive tracking signals and position information from marks, because boundary areas adjoining isolated information blocks have been written. When a radial jump to such an area is made, the reading unit will be globally positioned a short distance ahead of the information block to be read, for example, on the basis of distance information derived from a speed sensor on a motor for displacing the reading unit. The reading unit will then reach the adjoining area a short distance ahead of the information block to be read. In this area, the marks of the dummy information are present and the reading unit can therefore be accurately positioned in a conventional manner on the basis of information read from the record carrier. A further advantage is that boundary areas are written beyond the information block to be read, for the case where, due to inaccuracies during global positioning, the reading unit is positioned a short distance behind the information block to be read.

It is to be noted that a disc storage system is known from EP 0 328 240, in which the area on a disc-shaped record carrier intended for data storage is successively formatted in parts whenever a part is necessary for actual data storage. During formatting, areas are provided with position information before they are put into use and analyzed by way of writing and subsequent reading, with error control information being generated on the basis of the analysis. In the system according to the invention, the position information is already present in the track structure and areas which are not in use, namely the non-written boundary areas of areas which are in use, are written with dummy data by way of a writing action before or after an area for data storage has been put into use.

An embodiment of the device according to the invention is characterized in that the first detection apparatus are adapted i.e. have structures to enable it to detect the areas which are in use depending upon writing instructions received by the device. This has the advantage that whether areas are in use, can be determined without using storage means.

A further embodiment of the device according to the invention is characterized in that the first detection means are adapted to detect the areas which are in use depending upon use information on the record carrier. This has the advantage that whether areas are in use, can be directly determined from the use information without having to read the relevant areas themselves for this purpose.

A further embodiment of the device according to the invention is characterized in that the initialization apparatus are adapted to write a band-shaped area having a predetermined width. In this case, the non-written boundary areas are at least sufficient through a minimal width for forming a landing area for landing a reading unit of a reading device after a jump has been made. The width is chosen to be such that, in a majority of the standard reading devices, the reading unit will land within this width in the case of a jump. This has the advantage that the partly written record carrier can be read reliably by means of standard reading devices.

A further embodiment of the device according to the invention is characterized in that the initialization apparatus are adapted to write at an instant subsequent to performing a writing instruction, the instant being determined in dependence upon operational circumstances. This has the advantage that a user is hindered as little as possible by the initialization performance.

A further embodiment of the device according to the invention is characterized in that the dummy information is organized as N dummy information blocks, in which N is at least one and the information blocks are provided with position information. In these adjoining areas, the initialization apparatus write dummy information blocks which includes position information in the conventional manner, such as, for example addresses. This has the advantage that the reading unit can determine the position of the reading unit in the conventional manner based on the position information. At a small value of N, the written boundary area may be too small to land the reading unit, but a run-in area will have been formed for locking in reading apparatus prior to reading an information block in the relevant area which is in use. This is an advantage in a reading device according to the invention, which reading device can search the written area because the reading unit approaches the information block via the run-in area and the tracking means and read signal decoding means can lock in.

In accordance with a second aspect of the invention, a record carrier for use in the writing device is characterized in that the record carrier is provided with status information about the non-written or written state of areas on the record carrier, which status information can be reproduced in a predetermined manner. This has the advantage that, after reproducing the status information via the detection apparatus for detecting the written areas, the writing device knows the status of an area which is either written or not written and can therefore quickly decide whether initialization is necessary, because the area does not need to be read first. This requires a shorter time for performing a writing instruction and for initializing, if necessary, adjoining areas.

In accordance with a third aspect of the invention, a reading device is characterized in that the reading device is provided with search apparatus for searching an area written with marks. The reading device can follow the track only via marks and generate position information. When areas which are not contiguous and are separated by non-written areas are read, the reading unit will generally land a short distance ahead of the information block to be read, when a jump to such an area is made. The search means now have the advantage that a written area is searched, for example by displacing the reading unit further towards the jump until marks are found. Consequently, the reading device according to the invention can reliably read a partly written record carrier.

Those skilled in the art will understand the invention and additional objects and advantages of the invention by studying the description of preferred embodiments below with reference to the following drawings which illustrate the features of the appended claims:

BRIEF DESCRIPTION OF THE DRAWING

FIGS. 1(*a, b, c, d*) shows a record carrier provided with a track structure.

In the Figures, elements which correspond to elements already described have the same reference numerals.

DESCRIPTION OF THE PREFERRED EMBODIMENTS

Figure 2:
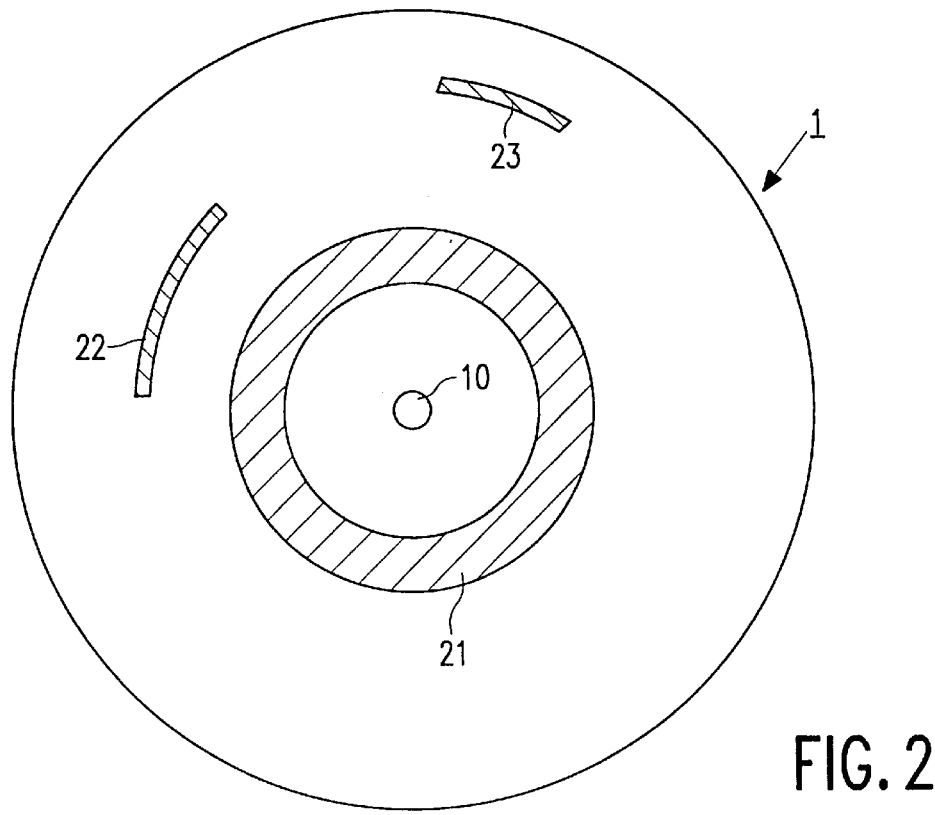
FIG. 2 shows a partly written record carrier.

FIG. 1*a* shows a disc-shaped record carrier 1 provided with a track 9 intended for recording and a central hole 10. The track 9 is arranged in accordance with a spiral pattern of windings 3. The track 9 is indicated on the record carrier by a track structure which is provided during manufacture of the blank record carrier. The track structure is constituted, for example by a pregroove 4 which enables the read/write head to follow the track 9 during scanning. FIG. 1*b* is a cross-section taken on the line b—b of the record carrier 1, in which a transparent substrate 5 is provided with a recording layer 6 and a protective layer 7. The pregroove 4 may be implemented as a pit or elevation, or it may have a material property deviating from its ambience. Moreover, the track structure may consist of an alternation of raised and deepened windings, referred to as land and groove patterns, with a transition from land to groove or vice versa taking place per winding. The recording layer 6 may be optically or magneto-optically writeable by means of a device for reading and/or writing information such as the known CD-Recordable. The information is organized in blocks and is represented by optically readable marks 11 in the form of a succession of areas reflecting much and little radiation, such as a succession of pits of different lengths in a CD. Such a rewritable disc is provided in the system of the new high-density optical disc, the Digital Versatile Disc (DVD). FIGS. 1*c* and 1*d* show two examples of a periodical modulation (wobble) of the pregroove. This wobble causes an extra signal in a tracking servosensor. The wobble is, for example, frequency-modulated and the position information such as an address or a time code is coded in the modulation. A description of a writeable CD system, which is provided with position information in this way, can be found in U.S. Pat. No. 4,901,300 and U.S. Pat. No. 5,187,699 hereby incorporated in whole by reference. A track structure may also include, for example, regularly divided partial patterns which periodically cause tracking signals. Another example of a track structure are header symbols formed by optically readable marks which are indicative of an address and indicate the start of the area for recording an information block. This description is based on information storage in a spiral track pattern which is filled from the inside to the outside, for example as in CD-ROM. The invention is applicable in a corresponding manner with other track patterns, in which the windings are concentric instead of spiral, or with differently formed record carriers such as optical tapes.

FIG. 2 shows diagrammatically a partly written disc-shaped record carrier 1. A lead-in area, file management information and use information is recorded in a first written area 21. Furthermore, a second and a third written area 22 and 23 are shown, which are isolated and are in use for storing use information. It is true that the record carrier 1 is provided with a track structure as described with reference to FIG. 1, but for a standard reading device it is not satisfactorily usable for positioning when the standard reading device derives the tracking and/or position information on the basis of marks. The entirely written area 21 will be readable for any reading device, because marks are present uninterruptedly from a radius to be minimally used (for the relevant type of record carrier). However, when such a standard reading device must read the isolated areas 22 or 23, for example addressed via a read command, it will displace a read head via a jump to a radial position in conformity with the address. After a global positioning, the standard reading device will attempt to read position information on the record carrier for a precision-positioning. However, since no marks are found, a standard device will not be able to further position the reading unit and will not reproduce information. If the track structure includes headers which are constituted by marks, the standard reading device will in principle be able to read them. However, due to the absence of intermediate marks in non-written areas, it will not be possible to position the reading unit satisfactorily above the track and reading of the headers in a non-written area is unreliable.

Figure 3:
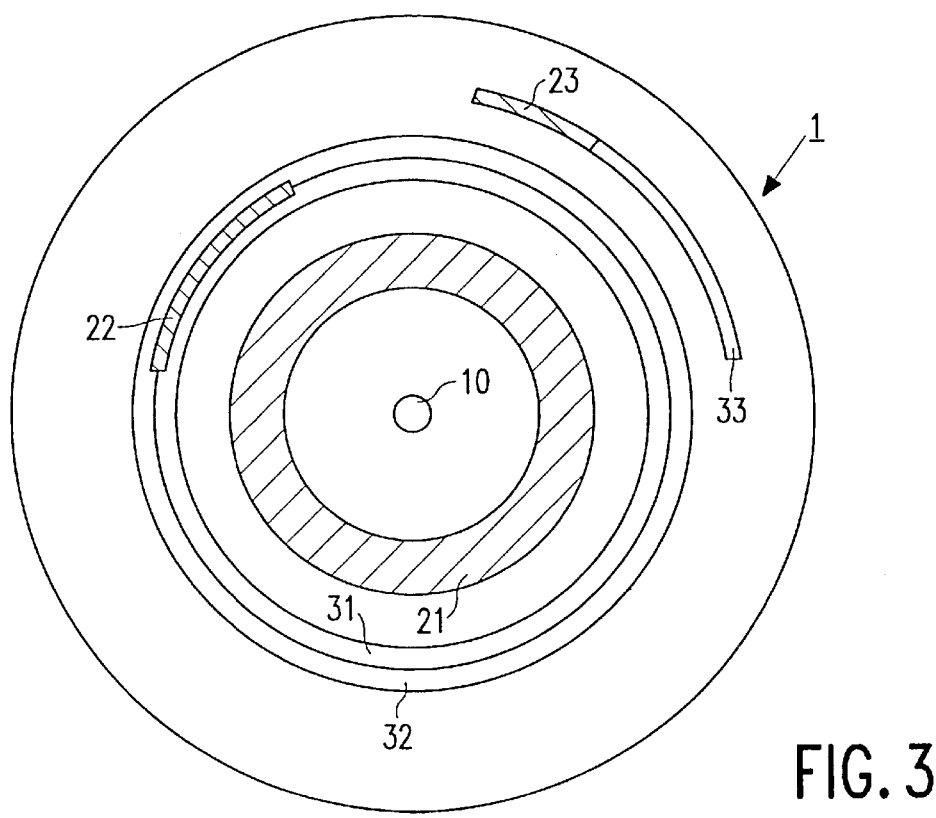
FIG. 3 shows a partly written record carrier of the invention with dummy information.

FIG. 3 shows a partly written record carrier with dummy information according to the invention. In addition to the areas 21, 22, 23 which are in use in FIG. 2, areas 31, 32 and 33 are initialized by writing them with marks. The initialized area 31 adjoins the isolated area 22 in a reading direction viewed in the radial direction from the central hole 10. In the case of an instruction for reading the area 22, a reading device will position a read head a short distance in front of this area. A first global positioning is based on the actual position (for example, in the file management information in area 21) and the displacement, for example, measured via a displacement sensor on the radial drive motor of the reading unit. The reading unit will then land in the initialized area 31. Subsequently, an accurate positioning takes place on the basis of reflected radiation via the marks of the dummy information. The reading unit can now be positioned accurately above the track and finds the desired area 22 by just following the track. In an embodiment of the invention, the dummy information is organized as dummy information blocks, for example with a fixed content such as zeros (Zero Blocks, ZB). The ZBs are provided in the conventional manner with control and address information, for example in headers. The organization of the ZB preferably does not deviate from ordinary information blocks, for example as regards error correction and the headers. When a reading unit finds such a ZB, the current position of the reading unit is derived therefrom in the conventional manner after global positioning and, based on this current position, the precision-positioning then takes place, for example by jumping several tracks from track to track.

In an embodiment of the system according to the invention, dummy information is also written in a boundary area 32 situated behind the isolated area 22 which is in use. During global positioning, the reading unit may also land in this boundary area 32 just beyond the desired area 22. The accurate positioning, in this case by jumping a number of tracks back to a position ahead of the area 22 which is in use, can now be based on the current position derived from the dummy information in the boundary area 32 situated behind it. The width (in the radial direction) of this boundary area 32 may be chosen to be smaller than the width of the area 31, because the global positioning is directed at a position ahead of the area 22 which is in use. The width of the subsequent area 32 may be chosen to be, for example approximately equal to the difference of the width of the preceding area 31 minus the width of the area 22 which is in use. For this purpose, the width of the area 22 which is in use should be known. The boundary areas 31 and 32 and the combination of the boundary areas 31, 32 and the area which is in use constitute a tape-shaped area within which a reading unit may land during global positioning. The width of this tape-shaped area is chosen depending on the expected positioning tolerances in the envisaged reading devices. In practice, for example a global positioning within 0.2 mm is possible. The width is then at least 0.2 mm, which yields a tape-shaped area of approximately 270 windings at a track pitch of 0.74 $\mu$m. In, for example a DVD-ROM, the entire record carrier may be written at a standard speed within approximately 1 hour and has a total writeable area of approximately 34 mm radially, so that the initialization of 0.2 mm will require approximately 20 seconds. If the record carrier must be made suitable for a reading device according to the invention, it is sufficient to initialize a narrower area. At a high transport speed of the reading unit during a jump, this reading device will at least recognize a difference between a written and a non-written area. After it has reached a written area, this reading device will decrease the transport speed so that the marks in the written area can be read and position information can be derived therefrom. It is to be noted that, in principle, eccentricity of the track pattern, in so far as is allowed within the system specifications of the record carrier, does not need to be added to the positioning tolerance because the written area will then be situated under a reading unit anyway during a part of a revolution and the positioning means can then lock in. Also a tolerance in the radial direction of the start of the area intended for data storage, for example the radial position of the information block with address 0000, does not need to be taken into account, because the distance between the jumps will be determined relatively with respect to a current head position.

Figure 5:
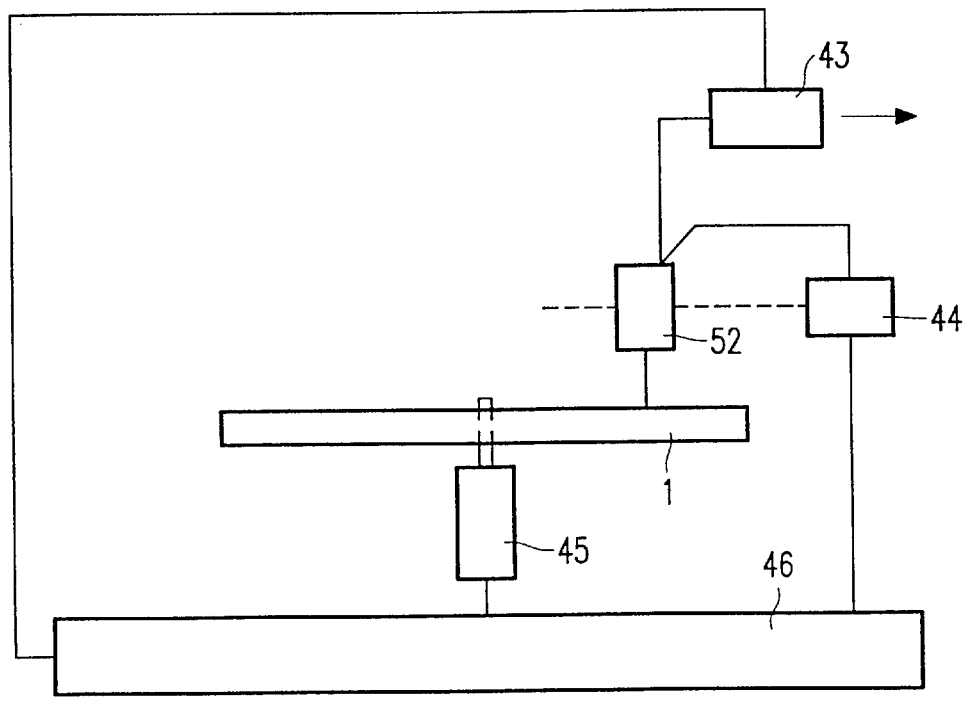
FIG. 5 shows a reading device of the invention.

In a further embodiment of the system according to the invention, the dummy information is written in a boundary area 33 preceding the area 23 which is in use. This area includes a small number of dummy information blocks (at least one) in the track directly preceding the area which is in use. A reading device according to the invention, as described hereinafter with reference to FIG. 5, is provided with apparatus for searching written areas after global positioning. It is then an advantage that the area 23 which is in use and is to be read is preceded by a written area 33 so that the tracking apparatus and read apparatus of such a reading device can lock in before the area to be read starts. The same applies to a standard reading device which, for example, in the case of a track structure with headers, can position the reading unit sufficiently accurately and reaches the area to be read. When the area is reached, the tracking and read apparatus are then in a locked-in state and the desired information blocks will then be read in a reliable manner.

Figure 4:
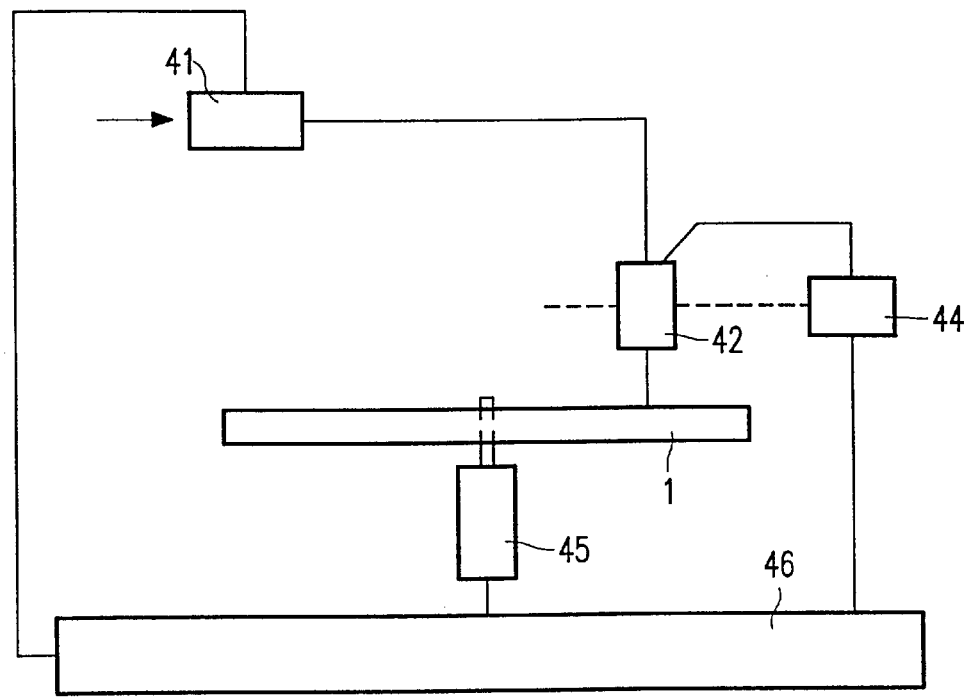
FIG. 4 shows a writing device of the invention for writing information blocks.

FIG. 4 shows a device for writing information blocks on a disc-shaped record carrier which is writeable, for example in a magneto-optical or optical way (via phase change) by means of a beam of electromagnetic radiation. During writing, marks representing the information are formed on the record carrier. The device is provided with drive apparatus 45 for rotating the record carrier 1, and with a write head 42 for scanning the track which is indicated by the track structure on the record carrier. The write head 42 is radially positioned with respect to the track by positioning apparatus 44, while position information is detected from the track structure. In accordance with known tracking and focus methods, the track is scanned with the write head and, for example, the tracking signal has a modulation due to the wobble in the pregroove. The tracking signal is demodulated and the position information coded therein is regained in the positioning apparatus 44 and passed on to the system control unit 46. The radial position of the write head can be verified via the regained position information. The information presented to the input of the write apparatus 41 is divided therein, if necessary, into information blocks and converted into a write signal for the write head 42. The writing apparatus 41 include, for example, an error coder and a channel coder. The system control unit 46 controls the positioning apparatus 44, the writing apparatus 41, and the drive means 45 and are equipped to perform the procedures, described hereinafter, for detecting whether areas are in use, for detecting non-written boundary areas and initializing with dummy information.

First, the system control unit 46 is adapted to detect whether information blocks are in use. In a first embodiment of this detection, the fact that the blocks are in use is derived from the received writing instructions and possibly also from successfully performed reading instructions. The moment the record carrier is introduced into the device, the system control unit keeps track of the areas which are in use, for example by using a list of addresses for a bit map in which each bit of a given address on the record carrier indicates the use information. For example, in a DVD the size of an information block is 32 kbyte so that a bit map for 8 Gbyte fits in one information block at 1 bit per information block. In the case of a writing instruction for a given address, the bit corresponding to this address is then set in the state indicating the in-use state. In a second embodiment, such a list or bit map on the record carrier is fixed (i.e. written) at a predetermined position, for example in or preceding the lead-in area where no use information may be stored. Instead, the use information may be stored as a file, while the rules of the file management system used (via Directories and Path Tables such as for example in ISO 9660) must be taken into account. In another embodiment, the use information is derived from information present on the record carrier in accordance with the file-management system, which information customarily comprises tables about the occupied or unoccupied state of addressable areas on the record carrier. Moreover, the system control unit may be adapted to search for written areas on the record carrier and subsequently decide on the basis of the contents of detected information blocks whether such an area is in use or is only initialized.

Secondly, the system control unit 46 is adapted to detect whether areas adjoining areas in use, have been written. Non-written boundary areas are subsequently initialized, as described below. In a first embodiment, the writing unit is positioned, on the basis of the track structure, above areas which precede or succeed an area which is in use. The presence of marks can be customarily ascertained from the reflected radiation. If there are marks, the area has been written and may even be in use itself. A reading function, generally via a combined write/read unit, is present in the conventional writing device. By reading the relevant boundary areas, it can be directly ascertained whether the areas have been written. If the dummy information is distinguishable from standard information, it can also be determined from the contents read whether dummy information is concerned. This distinction may be provided, for example, in the header of the dummy information blocks or, for example, by intentionally providing an error pattern in the dummy information blocks. In a second embodiment, a record carrier according to the invention is provided with status information indicating whether areas on the record carrier are written or not written. In an embodiment of the writing device according to the invention, the system control unit is then adapted to write and read the status information on the record carrier. Depending on the mode chosen for fixing the status information, the system control unit knows the location of the status information or a reference to the status information or uses the file management information in a conventional manner so as to reproduce the status information. The status information may be fixed, for example in the form of a bit map, with one bit indicating the status of a fixed area having a size corresponding to the minimum length of an information block. In existing optical disc systems, this length is determined by the error-correcting coding mode used. As an alternative, or as a supplement, a table with written areas can be fixed in which at least the end of the first written area (viewed in the radial direction from the central hole) is given. Likewise as with the use information, the status information on the record carrier may also be fixed at a predetermined position on the record carrier, for example, in or preceding the lead-in area where no use information may be stored. Another suitable position is near the end of the area intended for data storage, because, viewed globally, the record carrier will be filled from the beginning. If the area near the end is required for data storage when the record carrier is almost completely filled, the status information will be limited to a small quantity or may be dispensed with completely because then (substantially) no non-written areas will be left. Instead, the status information may be fixed as a file. In one embodiment of the writing device, the validity of this status information is determined after reading status information of the record carrier. A very safe method is to read areas to be initialized always first and then perform the initialization only if these areas are actually still unwritten. Consequently, the time required for initialization is doubled, but there is still an advantage with respect to the previously mentioned system in which status information is not used because in this system all areas must be read first, whereas now, in accordance with the status information, a part of the areas does not need to be read. In another embodiment, for example, extra validity information may be stored on the record carrier. For performing a first writing instruction, the device writes the validity information on the record carrier, indicating that the record carrier may include more written areas or areas in use than is indicated by the status and/or use information present thereon. Operational circumstances permitting, a new version of the status and/or use information is fixed, whereafter lastly the validity information is fixed again, now with the contents that the status and/or use information is completely up to date. If the session is interrupted, for example due to current drop-out or manual removal of the record carrier, the validity information on the record carrier indicates that the status information is incomplete. The temporary status information which has not been fixed yet is preferably stored in the writing device in a non-volatile memory so that after termination of a current drop-out the temporary status information can as yet be fixed. In another embodiment, a further indication may be included in the validity information, namely that a number of areas are still to be initialized before the record carrier completely complies with the requirements of a reading device, for example "partly ROM drive prepared" and a list of boundary areas which are still to be initialized. Moreover, for example, a gradation of the minimum width of the described areas may be included, for example, "minimal ROM drive landing area 0.2 mm". Furthermore, a record carrier in which there are no isolated areas because all interpositioned areas are initialized may be marked as such, "fully ROM drive prepared". A list with boundary areas may also be stored which may have to be broadened so as to achieve a greater reliability. Operational circumstances during a subsequent session of the relevant record carrier in the writing device permitting, these broadenings may be performed by further initializing the boundary areas. Moreover, when status and/or use information is stored, this information may be doubly fixed so as to have a reserve copy of these important data in case of damage of the first storage area.

The system control unit is adapted to initialize the non-written boundary areas and, to this end, writes dummy information via write head 42 on the basis of the track structure after positioning. The dummy information is preferably organized as ordinary information blocks with the associated header and address information. For example, zeros are used as contents. In a first embodiment, the non-written boundary area 31 preceding an area in use is initialized. A short run-in area 33 may then be written, which is formed by one or more information blocks, or a width of a band-shaped area may be written, as described with reference to FIG. 3. The system control unit may also be adapted to write the entire non-written area preceding the area which is in use, with the entire area always being written from the minimal radius up to and including the newly detected area in use. This has the advantage that, upon a jump to areas in use, a reading device never needs to cross a non-written area. A combination of both measures in a phased approach is achieved as follows. The system control unit writes the boundary area on at least a run-in length and on a larger, tape-shaped area if the operational circumstances allow this. Alternatively, at least a band-shaped area may be written, and, operational circumstances permitting, the entire area can be filled up from the beginning of the area intended for data storage till the most remote area being in use. In these combinations, the system control unit will thus first write the area to be minimally initialized when an instruction to eject the record carrier is given, and will only then perform the eject instruction. In a second embodiment, the system control unit is adapted to write the non-written boundary area 32 directly after the area in use, as described with reference to FIG. 3. A combination of writing the boundary area before and after the area in use is desirable. It is of course possible to further combine the measures and perform them in phases. The reception of a writing instruction is described as an example. During positioning, the system control unit detects that a short area preceding the addressed area is unwritten by reading the area until the desired address is reached. From this point, the system unit writes the addressed area with the information received in the writing instruction. Subsequently, the system control unit reads the boundary area directly following the area which has just been written. After performing the actual writing instruction, the system control unit then changes over to writing the detected non-written boundary areas. However, the instant of doing this can be postponed when a new writing instruction has meanwhile been received. The memory can then remember which areas must still be initialized. At a later instant, a broader area preceding the previously detected non-written area can also be read so as to ascertain whether this area is non-written, and this area can subsequently be initialized. If it is already known that the area is (non-)written, for example from status information read from a record carrier according to the invention as described with reference to FIG. 3, a boundary area preceding a new area to be put into use can be written directly prior to writing the addressed area. This has the advantage that the writing unit is positioned only once, after which it successively writes during a longer period of time. This is less time-consuming than two or three successive writing operations. In a further embodiment, the initialization instant is adapted to further operational circumstances. For example, the system control unit waits for a fixed period of time with the initialization after the last writing or reading instruction has been performed so as to enable a host computer to transmit the next instruction to the writing device. After this waiting time, the writing device then acquires an "idle mode" in which it changes over to the initialization operation on its own initiative. When a new writing or reading instruction in the idle mode is received, there will be a slightly longer response time of the writing device because it will first complete the dummy information block which is being written at that moment. A certain part of areas still to be initialized may also be considered to be necessary and a further part remote from the areas that are in use may be considered to be desirable. If there is sufficient time in the idle mode, both categories are initialized, but if an instruction for ejecting the record carrier has previously been received, then at least the necessary category will as yet be initialized. This causes a short waiting time for the user. Postponement of the initialization operation until an eject instruction has the advantage that a minimal number of areas is initialized. In fact, in a session between insertion and ejection of the record carrier, areas may first be considered as non-written boundary areas, while they are subsequently put into use themselves. Initialization within the session is therefore unnecessary and would only cause wear.

FIG. 5 shows a reading device according to the invention for reading information blocks. The reading device is provided with drive apparatus 45 for rotating the disc-shaped record carrier 1, and a read head 52 for scanning the track on the record carrier. The read head 52 is radially positioned on the track by positioning means 44 on the basis of signals derived from marks on the record carrier. In accordance with the conventional Differential Phase Detection or Differential Time Detection system (DPD or DTD), for example, the reflected radiation on a detector (not shown) can be received. The detector is subdivided into 4 sub-detectors. By determining phase or time differences between the signals of the sub-detectors, the position of the scanning spot with respect to the series of marks written in the track can be determined. In this respect it may be noted that such a device intended for reading Read Only record carriers such as, for example DVD-ROM, will not be provided with apparatus for deriving tracking and/or position information from a track structure on a rewritable record carrier. During reading, the signal from the read head 52 is converted into the information in the reading apparatus 43 including, for example, a channel decoder and an error corrector. Moreover, the device is provided with a system control unit 46 which will displace the read head 52 to a radial position, inter alia, based on a read command, which position will be at a short distance ahead of the area to be read (coarse positioning), and subsequently the system control unit will derive the current position via the read head 52 and the positioning apparatus 44 from position information read from the record carrier and subsequently (precision-)position the read head on the basis of the position information. The reading device according to the invention is provided with search apparatus for searching a written area if no marks can be read during the positioning operation. To this end, the system control unit 46 detects after a jump whether there are marks in the area where the read head 52 has landed. If no marks are present, the read head 52 is further displaced via positioning apparatus 44 until marks are detected. First, the system control unit can displace the read head in a direction in which the information blocks to be read are expected because it is attempted in the global positioning operation to position the read head ahead of these information blocks. Secondly, in a further embodiment, the read head may be displaced in the opposite direction when no marks are found in the first direction after a displacement through a predetermined distance. This is an advantage when, due to mechanical tolerances or other causes, the read head has landed, after a jump, beyond the area to be read.

An embodiment of the reading device is provided with detection apparatus for detecting the presence of marks, for example, for detecting the level of the high-frequency signal from the detector. After the global positioning operation, the read head is displaced at a raised radial speed until a written area is found, without having to reproduce information from the record carrier via the read apparatus, and without the tracking apparatus being in a locked-in state.

An embodiment of the reading device is provided with apparatus for determining the average track pitch. Since the radial distance must be computed when a jump is being made, the actual track pitch influences the radial position of the area to be read. Generally, the reading device will start from the track pitch described in the system specification of the relevant record carrier. During the global positioning operation, based on a displacement sensor, the accuracy can be improved by comparing the deviation between the computed landing position and the actually found landing position at previously performed jump instructions, and by determining a correction factor therefrom for the computed jump distance and the actual jump distance for the next jump. As a result, both a possible deviation of the displacement sensor and the deviation of the average track pitch of the relevant record carrier are taken into account in this correction process when determining the jump distance.

An embodiment of the reading device is provided with search apparatus which include apparatus for detecting track crossings of the beam with tracks in non-written areas of the track pattern, and the positioning apparatus are adapted for positioning depending upon the detected track crossings. For positioning in written areas, DPD or DTD positioning apparatus are adapted to detect deviations of the center of the track with respect to the scanning spot which is projected via the beam onto the record carrier. Upon global positioning in written areas, these deviations can be converted in a conventional manner into a count of the number of times the scanning spot crosses a track and are therefore a measure of the distance. The reading device is now provided with further means for detecting track crossings, such as the known Push-Pull detection, with which the track structure in non-written areas can be detected. It is not necessary to demodulate and decode position information from a modulation as described with reference to FIG. 1. By detecting and counting the tracks as indicated via the track structure, the distance at a jump is measured, and the positioning means are then controlled on the basis of the measured distance.

Figure 6:
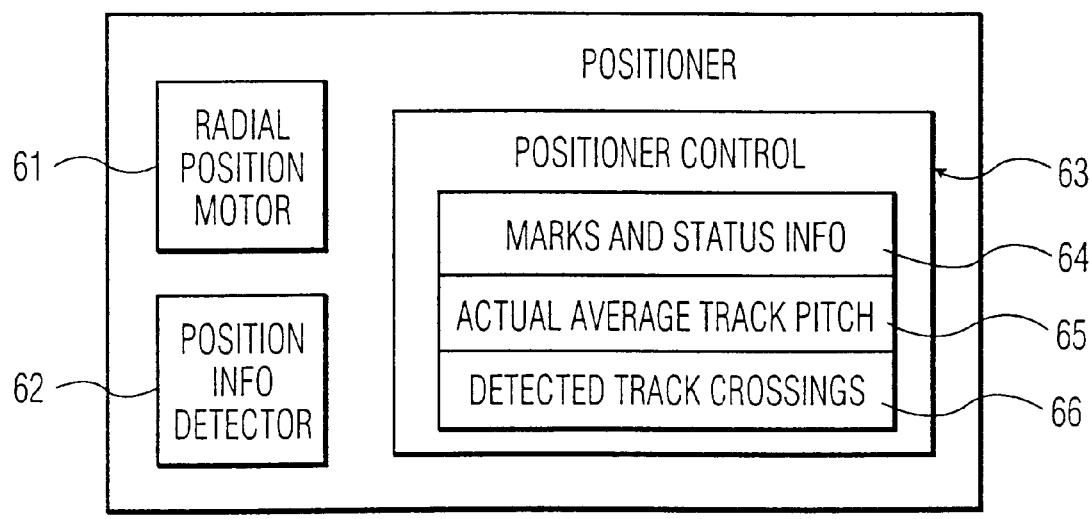
FIG. 6 shows details of a positioner of the invention.
Figure 7:
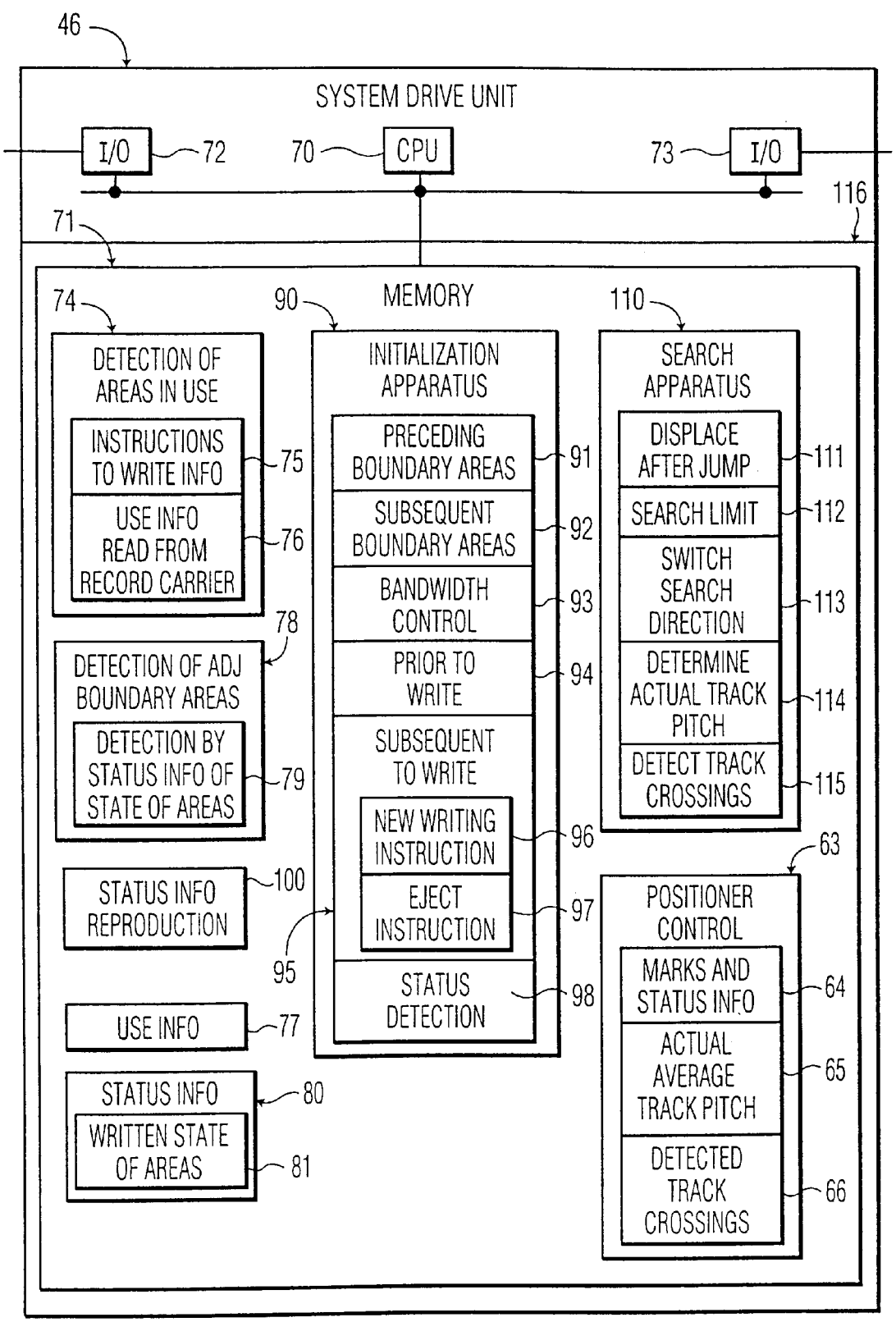
FIG. 7 shows details of a system drive unit of the invention.

FIGS. 6 and 7 shows positioner 44 and system drive unit 46 of FIGS. 4 and 5 in more detail. The purpose of these figures is to illustrate the claimed apparatus and they are not required for an understanding of the invention. The apparatus and relationships shown in this figure have been previously described in this specification, in relation to a specific embodiment of the invention, thus this portion of the description will only briefly identify the apparatus.

In FIG. 6, positioner 44 includes: positioning apparatus 61 for mechanically positioning the read/write unit; apparatus 62 detects marks and track wobble on the record carrier; position control apparatus 63 generates control signal for controlling the position of the read/write unit with respect to the track pattern on the record carrier (i.e. to control the positioning motor). The position control apparatus includes apparatus 64 for controlling position depending on the marks and on the status information (80 in FIG. 7) for the record carrier; apparatus 65 for controlling position based on actual average track pitch measured on the record carrier; and apparatus 66 for controlling position based on detected track crossings during a radial jump.

In FIG. 7, the system drive unit 46 includes a microprocessor 70, programmable memory 71 and ports 72 and 73 for receiving information and providing control signals and information. Memory 71 includes programmed apparatus for controlling the operation of CPU 70 and a copy of information that has been read or will be written to the record carrier, and other information required for operations. The programmed apparatus include apparatus 74 for detecting areas of the record carrier which are in-use for writing information blocks. Apparatus 74 includes: apparatus 75 for detecting areas in-use based on instructions received by the device for writing information; and apparatus 76 for detecting areas in-use based on use information 77 which is initially read from the record carrier, kept updated in memory, and occasionally written to update the record carrier. The programmed apparatus in memory 71 also includes apparatus 78 for detecting non-written boundary areas adjoining the areas which are in-use, and including apparatus 79 for detecting non-written boundary areas based on status information 80 initially read from the record carrier, kept updated in memory, and occasionally written to update the record carrier. The status information includes information 81 indicating the written or non-written state of areas on the record carrier.

Memory 71 also includes initialization apparatus 90 for writing dummy information into non-written boundary areas adjoining areas in-use for writing information blocks to the record carrier. The initialization apparatus includes: apparatus 91 for writing to boundary areas preceding areas in-use for writing information; apparatus 92 for writing to boundary areas subsequent to areas in-use for writing information; apparatus 93 for controlling the width of areas written with dummy information preceding or subsequent to areas in-use for writing information blocks; apparatus 94 for writing dummy information adjacent to an area immediately prior to writing information blocks to the area; and sequent apparatus 95 for writing dummy information subsequent to receiving a write instruction. Subsequent apparatus 95 includes: apparatus 96 for writing dummy blocks when no writing instructions have been received for a sufficient period; and apparatus 97 for writing dummy blocks when an ejection instruction or an instruction to turn off instruction has been received. The initialization apparatus further includes apparatus 98 for detecting status information on the record carrier about the status of areas.

The device includes apparatus 100 of reproducing status information 80. A second copy on the record carrier assures that it will be available if a portion of the record carrier is corrupted. Also, the status information and the use information for the disk is read from the record carrier and is preferably kept in a memory of the device for fast access.

The device also includes programmed search apparatus 110 to search to displace the reading unit in a radial direction for finding the beginning of a area desired to read from or write information. The search apparatus includes: apparatus 111 to search after making a jump to position predicted to be just before the desired area; apparatus 112 to limit the amount of forward searching, and apparatus 113 for searching in a previous area to the position to which the device jumped. The search apparatus also includes apparatus 114 for determining the actual track pitch of the record carrier; and apparatus 115 for counting the number of tracks crossed during a radial jump including tracks in unwritten areas.

Positioner control apparatus 63 may be provided within the system drive unit memory as shown or within the positioner apparatus 44 as shown in figure, or in another location in the device, or portions of the positioner control apparatus may be provided in one location and other portions provided in another location.

Memory 67 may be dynamic random access memory or non-volatile memory. The above specific embodiment with programmed devices may be implemented by reading programs and information from the record carrier 1 through ports 72 or 73, into memory 71. Alternatively the devices may be implemented by connecting a memory component 116 communicating with CPU 66 such as by inserting a memory cartridge into a slot or a non-volatile memory package into a socket.

Figure 8:
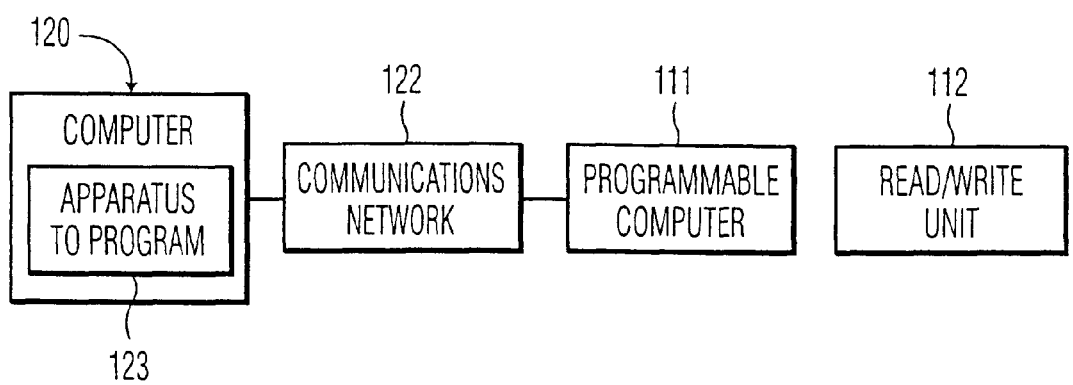
FIG. 8 shows a network of the invention.

The reading and/or writing device of the invention may include a programmable computer system or computer network. FIG. 8 shows computer system 120 and programmable computer system 121 with a read and/or write unit 122, a read unit 123 and a positioner 124 communicating through a communications network 122. Computer 120 includes apparatus 123 for programming computer 121 for implementing the inventions of this application. Computer 120 generates signals transferred through communication network 123 to the programmable computer 121 to provide the programmed apparatus of the invention. Thus if the read or write unit is subsequently connected to computer 122, then the read device and/or write device of the invention will be implemented, and the method of the invention practiced.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. A reading device comprising:
   a reading unit for reading information represented by optically readable marks in a track pattern on a record carrier using a beam of electromagnetic radiation;
   means for positioning the reading unit with respect to the record carrier depending on marks that have been read from the record carrier; and
   means for determining the position of an information block area for use in storing of one or more information blocks on the record carrier, regardless of whether information blocks have been written to the information block area, and regardless of whether information blocks have been written to previous or subsequent information block areas of the record carrier, the reading unit reading positioning information marks from a boundary area adjacent to an information block area, the positioning information being used for determining the position of the information block area.

2. A reading device comprising:
   a reading unit for reading information represented by optically readable marks in a track pattern on a record carrier using a beam of electromagnetic radiation; and
   means for positioning the reading unit with respect to the information carrier depending on the marks read from the record carrier;
   and in which:
      the information blocks are arranged on the record carrier in a reading direction;
      the positioning means jump the reading unit to a position preceding an information block to be read; and
      the positioning means displace the reading unit in the reading direction after making the jump to the position preceding the information block to be read.

3. The device of claim 2, in which the positioning means displace the reading unit in the reading direction at most through a predetermined distance and if the information block is not found subsequently displace the unit in a direction opposite to the reading direction.

4. A reading device comprising:
   a reading unit for reading information represented by optically readable marks in a track pattern on a record carrier using a beam of electromagnetic radiation; and
   means for positioning the reading unit with respect to the information carrier depending on the marks read from the information carrier;
   and in which:
      the positioning means determine an actual average track pitch in the track pattern of the record carrier and position the reading unit with respect to the information carrier depending on the actual average track pitch.

5. A reading device comprising:
   a reading unit for reading information blocks represented by optically readable marks in a track pattern on a record carrier using a beam of electromagnetic radiation; and
   means for positioning the reading unit with respect to the information carrier depending on the marks read from the record carrier;
   and in which:
      the positioning means detect track crossings of the beam depending on positioning information written in boundary areas in areas of the track pattern in which information blocks are not written in information block areas; and
      the positioning means position the reading unit with respect to the information carrier depending on the detected track crossings.

6. A reading device comprising:
   a reading unit for reading information represented by optically readable marks in a track pattern on a record carrier using a beam of electromagnetic radiation; and
   means for positioning the reading unit with respect to the information carrier depending on the marks read from the record carrier;
   and in which:
      the reading unit is a reading/writing unit for also writing areas of the record carrier using the beam of electromagnetic radiation with marks representing information;
      the positioning means position the reading unit depending on a track structure defining a track pattern on the record carrier;
      the reading device further comprises:
         first means for detecting information block areas of the record carrier which are for writing information blocks of an information signal;

second means for detecting non-written boundary areas adjoining the information block areas; and initialization means for writing the non-written boundary areas with positioning information for determining the position of the beginning of information block areas.

7. The device of claim 6, in which the first detection means detect the information block areas depending on writing instructions received by the device.

8. The device of claim 6, in which the first detection means detect the information block areas depending on use information read from the record carrier.

9. The device of claim 6, in which the second detection means detect the non-written boundary areas depending on status information read from the record carrier, the status information indicating the written state of areas.

10. The device of claim 6, in which the initialization means write the positioning information in the non-written boundary areas directly preceding the areas for writing information blocks.

11. The device of claim 6, in which the initialization means write the positioning information in the non-written boundary areas directly subsequent to the areas for writing information blocks.

12. The device of claim 6, in which the initialization means write a band-shaped area having a predetermined width.

13. The device of claim 6, in which the initialization means write at an instant prior to performing a writing instruction.

14. The device of claim 6, in which the initialization means write at an instant subsequent to performing a writing instruction, the instant being determined depending on operational circumstances.

15. The device of claim 14, in which the operational circumstances include the absence of new writing instructions and/or the reception of an instruction to eject the record carrier or turn off the device.

16. The device of claim 6, in which the reading means read status information about the non-written or written state of information areas on the record carrier.

17. The device of claim 6, in which: the positioning information is dummy information organized as N dummy information blocks, in which N is at least one; and the information blocks are provided with further position information.

18. A record carrier of the rewriteable type for storing information blocks, comprising:
  a substrate;
  a track structure on the substrate defining a track pattern of the record carrier;
  the track structure including multiple information block areas and multiple boundary areas, the information block areas being proceeded by adjacent boundary areas;
  marks written in the track pattern using a beam of electromagnetic radiation, the marks indicating information;
  the information including information blocks written in the information block areas;
  the information including position information position information in the boundary areas;
  the information including status information about the nonwritten or written state of information block areas on the record carrier.

19. A method of reading information, comprising the steps of:
  providing a record carrier with written marks in a track pattern for reading using a beam of electromagnetic radiation, the marks representing information blocks in information block areas and positioning information in boundary areas before or after the information block areas and adjacent to the information block areas;
  reading the positioning information or other positioning information from the record carrier;
  jumping the reading unit to a position for searching for the beginning of an information area on the record carrier, the position to which the reading unit is jumped depending on the positioning information read from the record carrier;
  reading the positioning information from the boundary area;
  determining the position of the reading unit with respect to the information block area, depending on the position information read from the boundary area, regardless of whether the information block area has been written with information blocks; and
  beginning the reading the information area depending on the determined reading unit position.

20. The method of claim 19 in which: the positioning information read by the unit includes position information represented as a wobbling pregroove having a varying frequency which represents an absolute position in the track; and the positioning information written in the boundary areas consists of dummy information.

21. The device of claim 1 in which the record carrier is disk-like with a circumferential or spiral track structure and the positioning includes radial positioning with respect to the track and circumferential positioning along the track.

22. The device of claim 1, in which:
  the information blocks are arranged on the record carrier in a reading direction;
  the positioning means jump the reading unit to a position preceding an information block to be read; and
  the positioning means displace the reading unit in the reading direction after making the jump to the position preceding the information block to be read;
  the positioning means displace the reading unit in the reading direction at most through a predetermined distance and if the information block is not found, to subsequently displace the unit in a direction opposite to the reading direction;
  the positioning means determine an actual average track pitch in the track pattern of the record carrier; and position the reading unit depending on the actual average track pitch; and
  the positioning means detect track crossings of the beam with tracks in non-written areas of the track pattern, and position the reading unit depending on the detected track crossings.

23. The device of claim 6, in which:
  the first detection means detect the areas which are for storage of information blocks, depending on writing instructions received by the device;
  the first detection means detect the areas which are for storage of information blocks, depending on use information read from the record carrier;
  the second detection means detect the non-written boundary areas depending on status information read from the record carrier, the status information being indicative of the written state of areas;
  the initialization means write the non-written boundary areas directly preceding the area which is for storage of information blocks;

the initialization means write the non-written boundary areas directly subsequent to the area for storage of information blocks;

the initialization means write a band-shaped area having a predetermined width adjacent to the area for storage information blocks;

the initialization means write at an instant prior to performing a writing instruction or an instant subsequent to performing a writing instruction, the instant being determined depending on operational circumstances;

the operational circumstances include the absence of new writing instructions and/or the reception of an instruction to eject the record carrier or turn off the device;

the initialization means are provided with status detection means for detecting status information about the non-written or written state of areas on the record carrier;

the positioning information is dummy information organized as N dummy information blocks, in which N is at least one and the information blocks are provided with additional position information; and the record carrier is provided with status information about the non-written or written state of areas on the record carrier;

the information blocks are arranged on the record carrier in a reading direction;

the positioning means jump the writing unit to a position preceding an information block to be read;

the positioning means displace the writing unit in the reading direction after making the jump to the position preceding the information block to be read;

the positioning means displace the writing unit in the reading direction at most through a predetermined distance and if the information block is not found, to subsequently displace the unit in a direction opposite to the reading direction;

the positioning means determine an actual average track pitch in the track pattern of the record carrier and position the reading unit depending on the actual average track pitch; and the positioning means detect track crossings of the beam with tracks in non-written areas of the track pattern, and position the reading unit depending on the detected track crossings.

* * * * *